United States Patent [19]

Cortopassi

[11] 4,099,669
[45] Jul. 11, 1978

[54] GUIDANCE CONTROL SYSTEM FOR SELF-PROPELLED MOBILE SPRINKLER IRRIGATION SYSTEMS

[76] Inventor: Dean A. Cortopassi, 11292 N. Alpine Rd., Stockton, Calif. 95205

[21] Appl. No.: 748,124

[22] Filed: Dec. 6, 1976

[51] Int. Cl.² ............................................. B05B 3/18
[52] U.S. Cl. ........................................ 239/11; 180/98; 239/181; 239/177; 356/172
[58] Field of Search ............... 356/172; 239/177, 212, 239/11, 180, 181; 180/98; 137/344

[56] References Cited

U.S. PATENT DOCUMENTS

| | | | |
|---|---|---|---|
| 3,712,544 | 1/1973 | Ririe et al. | 239/177 |
| 3,972,623 | 8/1976 | Funayama | 356/172 |
| 3,987,964 | 10/1976 | Pittman et al. | 239/287 X |
| 4,029,415 | 6/1977 | Johnson | 356/172 X |

*Primary Examiner*—Joseph F. Peters, Jr.
*Assistant Examiner*—Michael Mar
*Attorney, Agent, or Firm*—Naylor, Neal & Uilkema

[57] ABSTRACT

A mobile sprinkler irrigation system comprising an elongate sprinkler supply pipe supported at one end by a self-propelled pace carriage and along the length thereof by a plurality of spaced self-propelled follower carriages. A tower on the pace carriage supports a laser projection system that projects a laser plane parallel to and along the length of the sprinkler supply pipe. The follower carriages carry laser sensor units deposed to intercept the laser plane whenever a follower carriage falls out of alignment with the pace carriage. Control circuitry operates in response to the sensors to control the propulsion wheels for the follower carriages so that the carriages follow the laser plane. Thus, the follower carriages follow the path of the laser plane, as defined by the pace carriage, whether the path be curvilinear, or rectilinear.

11 Claims, 5 Drawing Figures

GUIDANCE CONTROL SYSTEM FOR SELF-PROPELLED MOBILE SPRINKLER IRRIGATION SYSTEMS

BACKGROUND OF THE INVENTION

This invention relates to the guidance of self-propelled sprinkler mobile irrigation systems and, particularly, to a guidance system in which each wheeled support unit along the length of a long irrigation pipe is held in alignment by a laser plane projected from a movable source and sensed by motor-actuating detectors on the wheeled support units whenever the irrigation pipe becomes misaligned.

In recent years there have been many advances in the development of large self-propelled sprinkler irrigation systems. The improved systems have proved to be very much more efficient in speed, labor requirements, and water consumption than were the older flood-type irrigation systems. In general, such sprinkler systems pump the irrigation water from a central well or other water source into a long supply pipe that carries rotating sprinklers at appropriate intervals and which is supported along its length by a plurality of spaced movable carriages that very slowly pivot the pipe around the irrigation water source. In areas where there are very large and relatively flat tracts, the systems are often over a quarter of a mile in length and provide efficient irrigation to huge farm tracts.

Self-propelled sprinkler irrigation systems employing multiple pipe supporting carriages must incorporate some means for independently controlling movement of the carriages to assure that the water supply pipe is maintained reasonably straight while it is slowly, and sometimes intermittently, moving. Most often, this is accomplished by a system of control cables that are rigged along the supply pipe so that they are subjected to stress changes as the pipe bends. These stress changes may then be translated into motion that may be used to control drive motors that are electrically driven or powered by the water flow in the pipe, or control actuating pistons coupled to linkage that will adjust the location of the pipe carriage to the point of neutral stress of the control cables.

The central well system described above irrigates a large circular pattern and, in the typical square farm tract, fails to cover over 20% of the tract, or approximately 34 unproductive acres per quarter section. While such inefficiency may have been considered negligible during times and in areas where land costs were relatively low and crops were abundant, rising land costs demand that full use be made of all tillable soil. Therefore, the practical irrigation system of today is one that will evenly irrigate a full rectangular pattern. This, of course, may be accomplished by replacing the central pivot of the above-described systems with an irrigating water source that moves linearly, such as by the use of a carriage supported system that pumps irrigation water into the supply pipe as the carriage moves along an irrigation canel that runs the length of the farm tract. Such a system is described, for example, in U.S. Pat. No. 2,628,863, now expired. It has been found, however, that the self-propelled irrigation systems that employ the above-described stressed control cable system of pipe alignment do not track adequately to accommodate rectilinear pipe movement over long rectangular areas. Efforts to so use the control cable systems have resulted in damage to the pipe and its supporting structure and in unsatisfactory irrigation with some areas receiving excessive or inadequate quantities of water because of excessive pipe bending during the irrigating process.

SUMMARY OF THE INVENTION

The control system of the present invention can maintain the irrigation water supply pipe in a nearly precise straight line without the use of stressed control cables. Briefly described, the invention is for an electro-optical control system employing a laser, the beam of which is rotated around a horizontal axis to form a plane that intersects the length of the irrigation water supply pipe. Each of the motor-driven, pipe-supporting carriages along the length of the pipe is provided with sensors arranged so as to sense whether the pipe at the carriage is leading or lagging the laser plane. As the pace unit that carries the laser projection system is moved, the laser plane will likewise move to intercept the sensors on each pipe-supporting follower carriage and circuitry coupled to the sensors will actuate propulsion motors that drive the follower carriages to maintain the respective follower carriages in alignment. If, because of the intentional reversal of the pace unit or the possible skidding of the follower carriage the laser plane intercepts a leading sensor, the associated circuitry will reverse the propulsion motor to again re-center the laser plane. Because each follower carriage that supports the pipe along its length is individually guided by the laser plane, it is apparent that, if desired, the previously described circular pattern of irrigation is easily obtainable by merely pivoting the laser plane projector about its vertical axis. A further advantage of the present system is that the pace unit and the pipe-supporting follower carriages may be self-propelled from one tract to another. Still another advantage is that the control system is not affected by relative elevational movement of the respective follower carriages.

BRIEF DESCRIPTION OF THE DRAWINGS

In the drawings which illustrate a preferred embodiment of the invention.

DESCRIPTION OF THE ILLUSTRATED EMBODIMENT

Figure 1:
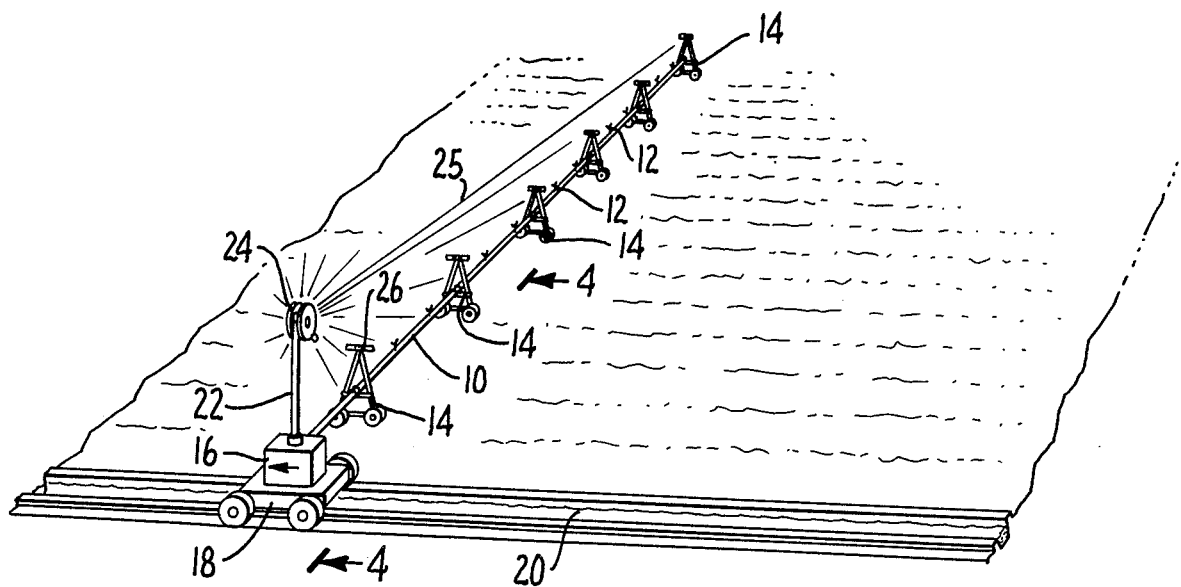
FIG. 1 is a perspective view illustrating a self-propelled sprinkler irrigation system provided with the electro-optical control of the invention.

Turning now to the illustrated embodiment of the invention, FIG. 1 illustrates a linear moving automated sprinkler irrigation system in which an irrigation water supply pipe 10, which is provided with a plurality of appropriately spaced rotating sprinklers 12, is supported by a plurality of self-propelled, motor-driven follower carriages 14. Supply pipe 10 is connected at one end to a high-pressure pump unit 16 which is supported on a wheeled pace carriage 18 that moves along an irrigation canal 20. Mounted atop the pump unit 16 is a vertical tower 22 having at its top a planar laser projector 24 which is disposed to produce a generally vertical energy plane 25 that is directed to intercept the center line of the supply pipe 10. The laser projector 24 may be of the rotating laser type wherein the laser gun spins about an axis (e.g. the type manufactured and sold by Sprectra-Physics, Inc., of Mountain View, California) or of a type employing a laser gun to project its beam up to a vibrating prism that will reflect a vertical plane toward the supply pipe 10.

Figures 2, 3:
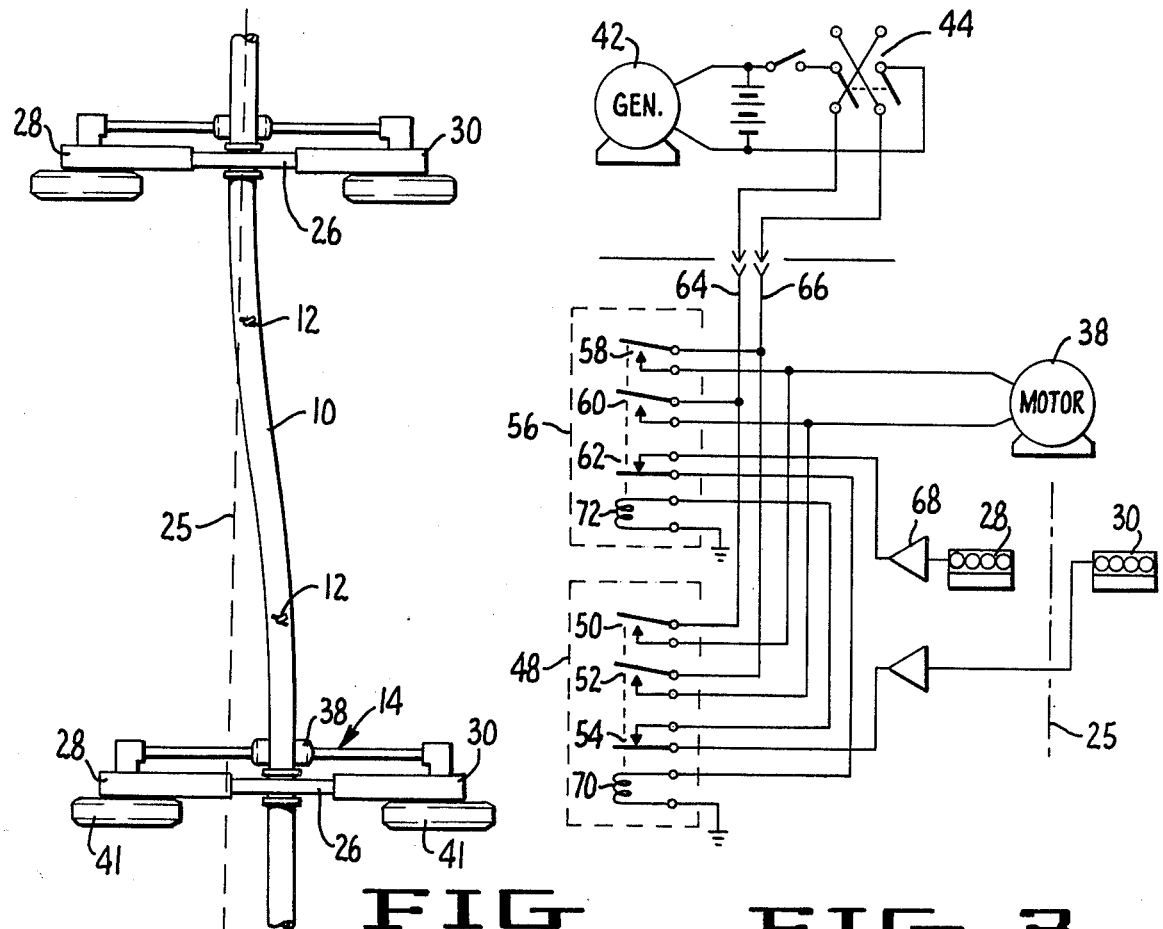
FIG. 2 is a plan view illustrating a section of supply pipe supported by two follower carriages, one of which is misaligned with the laser plane.
FIG. 3 is a schematic diagram illustrating an electrical control circuit that may be employed in each follower carriage.

Mounted near the top of each wheeled carriage 14 is a beam 26 that supports a pair of spaced laser detectors or sensors 28 and 30, as best illustrated in FIG. 2. Sensors 28 and 30 are preferably housed within a roofed structure 40 (see FIG. 4); and, that is open to permit them to intercept the laser plane 25, but which affords a maximum protection from the water sprayed by the rotating sprinklers 12. Sensors 28 and 30 are preferably spaced from one another by approximately twenty inches and are aligned so that when laser plane 25 bisects the length of the supply pipe 10, the plane 25 is approximately midway between the spaced sensors.

If the pace carriage 18 is moving toward the left, as indicated by the arrow through the laser plane 25 of FIG. 2, each of the pipe supporting carriages 14 that lags behind the carriage 18 will subject its lagging sensor 28 to the laser plane 25. As will be described subsequently, the signals produced by a laser-excited lagging sensor will energize circuitry housed within the follower carriage associated therewith. This circuitry will activate a propulsion motor 38 for the carriage which, through appropriate gearing, will rotate the wheels designated 41 of the carriage, thereby advancing the carriage approximately ten inches to the point where the laser plane 25 will be approximately midway between the lagging sensor 28 and the leading sensor 30. If, for some reason, a follower carriage 14 is advanced to the point where the laser plane 32 is intercepted by the leading sensor 30, then the circuitry will cause the motor 38 to reverse and again place the laser plane midway between the leading and the lagging sensors. It is, thus, apparent that the carriage 18 that supports the laser projector 24 becomes a pace unit which determines the speed and direction of each of the follower carriages supporting the supply pipe 10.

As previously mentioned, the wheeled pace carriage 18 contains a pump unit 16, in addition to the laser projector 24. The pump unit is driven by an internal combustion engine which drives a D.C. generator 42 to provide propulsion power to both the pace carriage and each of the follower carriages.

As is best illustrated in FIG. 3, the generator 42 carried by the pace carriage 18 supplies D.C. power through a suitable forward/reverse switch 44 to relay circuitry contained in each follower carriage to control the operation of the propulsion motor 38 of the follower carriage as directed by the sensors 28 and 30. In the circuitry illustrated in FIG. 3, the lagging sensor 28 controls the operation of a relay 48 which comprises two pairs of single-pole, single-throw, normally open contacts 50 and 52 and one pair of single-pole, single-throw, normally closed contacts 54. Similarly, the leading sensor 30 controls the operation of a relay 56 containing relay contacts 58, 60 and 62 which are identical with the contacts 50, 52 and 54 in relay 48.

D.C. power transmission lines 64 and 66 are connected to contacts in each relay 48 and 56. The transmission line 64, carrying current of a polarity determined by switch 44, is coupled to one contact 60 of the relay 56 and to contact 50 of the relay 48; line 66 is connected to one of the contacts 58 of relay 56 and to contact 52 of relay 48. The other contacts 58 of relay 56 and 50 of relay 48 are coupled together and to one terminal of the motor 38, while the other contacts 60 of relay 56 and 52 of relay 48 are connected together and to the opposite terminal of motor 38. This connection merely develops a two-pole, two-throw arrangement so that actuation of the relay 56 will apply power of one polarity to the motor while the actuation of relay 48 will apply power of the opposite polarity, thereby reversing the direction of the motor.

To prevent any possibility of malfunction which may result in both relays 48 and 56 being actuated at the same time, the normally closed contacts 54 and 62 provide a series connection between the sensors 28 and 30 and their associated excitation coils in relays 48 and 56. Thus, any current signal produced by the sensor 28 is appropriately amplified by the amplifier 68 and applied through the normally closed contact 62 of the relay 56 and, then, through the excitation coil 70 of the relay 48. Similarly, sensor 30 is coupled through the normally closed contact 54 to the excitation coil 72 of the relay 56. If sensor 28 is activated by the laser plane 25, its signal passes through the contact 62 and the excitation coil 70 to actuate the relay 48. This closes the contacts 50 and 52 to apply power of a first polarity to the motor 38 while simultaneously opening the normally closed contact 54 to prevent any accidental excitation of the coil 72 of the relay 56. It is, therefore, apparent that activation of sensor 28 by its interception of laser plane 25 will drive the motor 38 in one direction, while the excitation of the sensor 30 will drive the motor 38 in a reverse direction.

Normally, the excitation signals from laser sensors 28 and 30 are in the form of resistance changes which must be converted into appropriate current signals for relay coil excitation. Therefore, the sensor resistances are measured and excitation currents are generated by suitable amplifiers, such as amplifier 68 of FIG. 3. In the preferred embodiment, the amplifiers contain suitable storage capacitors to produce an excitation current output signal that remains for approximately two seconds after the cessation of the laser excitation signal from the sensors. This time delay feature assures that the propulsion motor will continue to drive the follower carriage to the point where the vertical laser plane is midway between the lead and lag sensors, or about ten inches past the point where the sensors ceased to see the laser plane.

Figure 4:
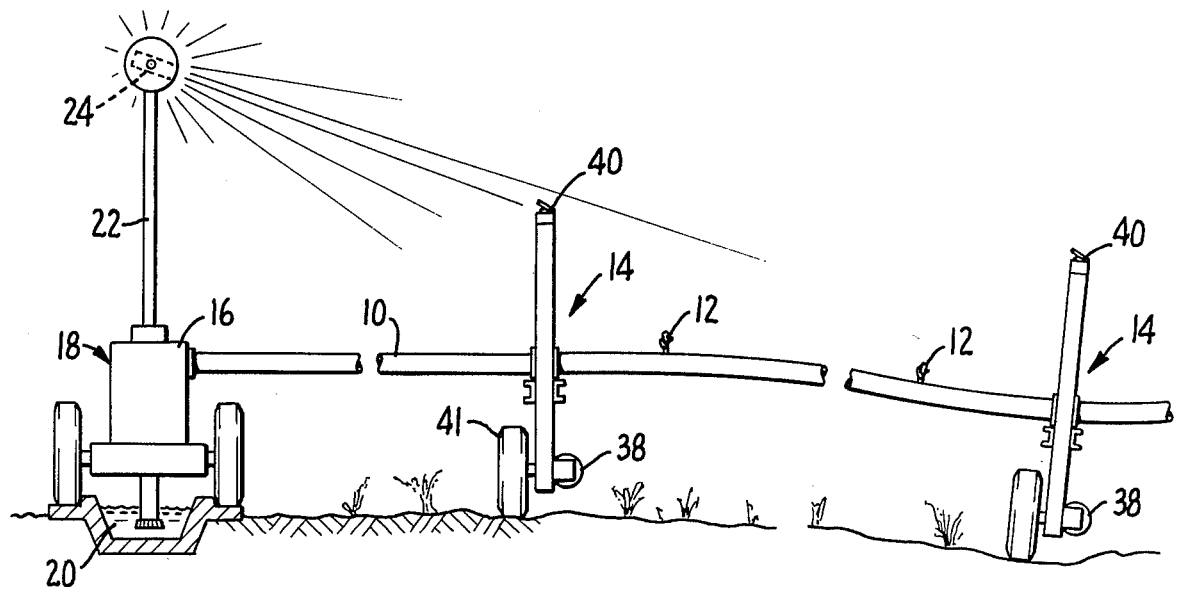
FIG. 4 is an elevational view taken along the plane designated by Line 4—4 of FIG. 1, illustrating a typical positioning of the pace unit over an irrigation channel and two follower carriages with sensors adapted to intercept the laser plane projected by the pace unit; and, FIG. 5 is a plan view of a farm tract illustrating the operation of the laser controlled guidance system in both linear and circular patterns.

FIG. 4 illustrates, in more detail, the pace unit 18, the engine-driven pump unit 16, and the laser projector 24. Pace unit 18, as previously mentioned, is a self-propelled wheeled carriage that moves parallel to an irrigation canal 20 and pumps water therefrom into the supply pipe 10 for irrigation through the rotating sprinklers 12.

Figure 5:
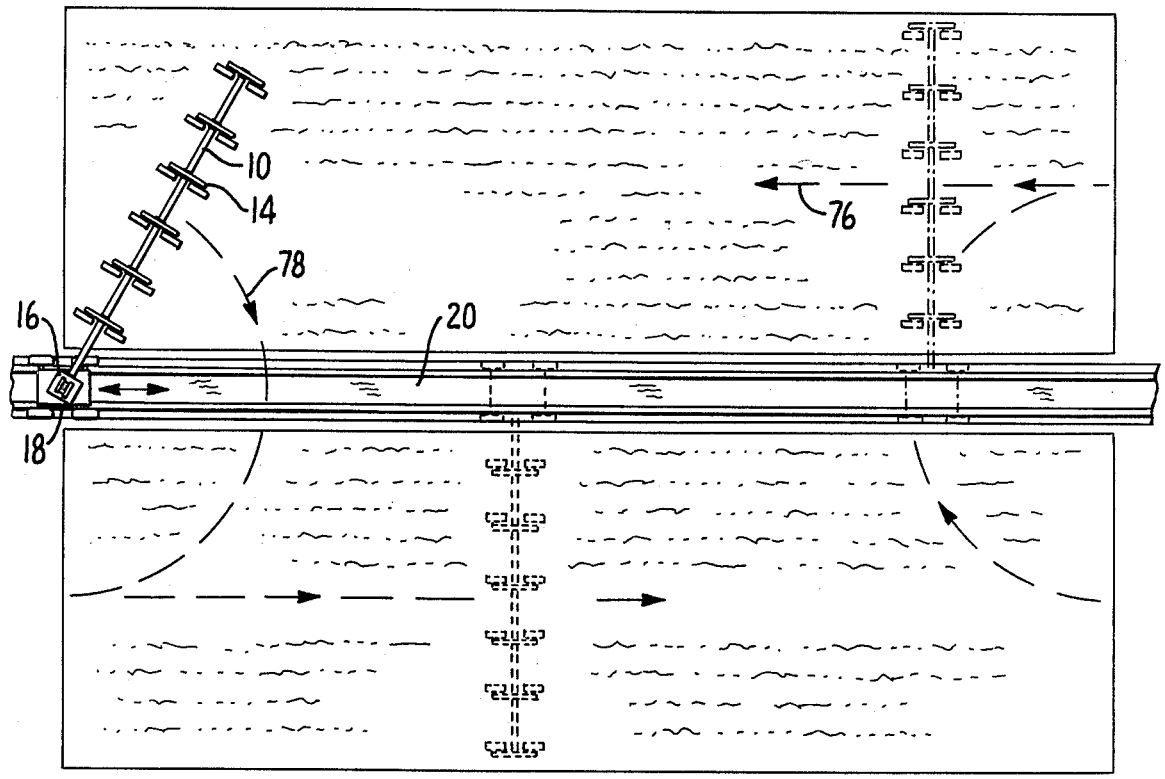

In normal operation, the laser projector 24 is fixed to generate a plane that is moved in a path that is normal to the irrigation ditch 20, thereby causing the follower carriages to carry the supply pipe 10 along a rectilinear path, as illustrated by the arrows 76 of FIG. 5. If, after completing the irrigation of a portion of a rectangular tract it is desired to turn the supply pipe 10 to irrigate a side opposite to the canal 20, it is merely necessary to rotate the laser projector 24 about its vertical axis, in which case the sensors associated with each of the follower carriages will drive the supply pipe 10 in a circular pattern, such as indicated by the arrow 78 of FIG. 5. It is, thus, apparent that the laser guidance system of the invention can effectively and reliably control the motion, the direction, and the irrigation pattern of the sprinkler irrigation system.

CONCLUSION

Although a preferred embodiment of the invention has been illustrated and described, it should be understood that the invention is not intended to be limited to the specifics of this embodiment, but rather is defined by the accompanying claims.

What is claimed is:

1. A guidance system for a self-propelled sprinkler irrigation system in which a supply pipe, carrying a plurality of sprinklers, is coupled at one end to a source of irrigation water under pressure and is supported above the ground by a plurality of spaced carriages each having propulsion means, said guidance system comprising:

means coupled to the pipe for generating a generally vertical plane of laser produced energy:

means for moving the laser plane forwardly relative to the carriages;

detecting means on each of the spaced carriages supporting the supply pipe and positioned to intercept said laser plane, said detecting means producing an electrical intercept signal indicative of interception of said laser plane; and circuit means coupled to said detecting means and to the carriage propulsion means for energizing said propulsion means in response to an intercept signal from said detecting names to maintain the carriage in general alignment with the laser plane.

2. The guidance system claimed in claim 1, wherein said detecting means includes first and second laser detectors, said detectors being spaced apart in a line substantially perpendicular to said laser plane and said supply pipe.

3. The guidance system as claimed in claim 2, wherein said circuit means energizes said carriage propulsion means to move said carriage in a first direction in response to an intercept signal from said first laser detector and in the opposite direction in response to an intercept signal from said second laser detector.

4. The guidance system claimed in claim 3, wherein said laser plane generating means is powered by electrical power means associated with said source of irrigation water.

5. The guidance system claimed in claim 1, wherein said laser plane generating means generates a laser plane by rotating a laser on a horizontal axis.

6. The guidance system claimed in claim 1, wherein said laser plane is generated by projecting the beam of a laser against a reflecting surface vibrating on a horizontal axis.

7. The guidance system claimed in claim 4, wherein said carriage propulsion means includes a reversible electric motor powered by said electrical power means, said motor being coupled to drive wheels on said carriage.

8. The guidance system claimed in claim 7, wherein said source of irrigation water includes a portable power source coupled to drive said electrical power means and a pump for supplying water under pressure to said supply pipe, said power source being mounted on a pace unit carriage that is propelled by said power source along an irrigation canal.

9. The guidance system claimed in claim 8, wherein said laser plane generating means is rotatable about a vertical axis and movable in a linear direction normal to the axis of said supply pipe for respectively causing said supply pipe to move in a circular path about said pace unit carriage and to move in a linear path with said carriage and along said canal.

10. A method for controlling the movement and alignment of a self-propelled sprinkler irrigation system in which a supply pipe carrying a plurality of sprinklers is coupled at one end to a source of irrigation water under pressure and is supported above the ground by a plurality of spaced carriages each having propulsion means, said method comprising the steps of:

providing each of the plurality of carriages with a pair of laser detectors, said detectors being spaced apart on a line normal to the supply pipe and positioned to intercept a laser beam originating at the source of irrigation water, the first of said pair of detectors being coupled to circuitry for driving said carriage in a forward direction, the second of said pair being coupled to circuitry for driving said carriage in a reverse direction;

generating at said source of irrigation water a generally vertical plane of laser energy directed along said supply pipe and into the space between said pair of spaced-apart laser detectors; and, moving said vertical plane in a forward direction so that said plane is intercepted by the first of said pair of detectors as said carriage is driven in a forward direction to follow said moving plane.

11. A method for controlling the movement of a self-propelled irrigation system in which a supply pipe carrying a plurality of sprinklers is coupled to a source of irrigation water under pressure and is supported above the ground by a plurality of spaced carriages each having propulsion means, said method comprising the steps of:

generating a generally vertical plane of laser energy directed along said supply pipe;

moving the vertical laser plane forward relative to the carriages;

sensing the position of the laser plane relative to the respective carriages and propelling said carriages in response to the sensed position to maintain the carriages in general alignment with the plane.

* * * * *